United States Patent

[11] 3,603,379

| | | |
|---|---|---|
| [72] | Inventor | Louis H. Leonard, Jr. Dewitt, N.Y. |
| [21] | Appl. No. | 814,293 |
| [22] | Filed | Apr. 8, 1969 |
| [45] | Patented | Sept. 7, 1971 |
| [73] | Assignee | Carrier Corporation Syracuse, N.Y. |

[54] HEATING AND COOLING SYSTEM
7 Claims, 5 Drawing Figs.

[52] U.S. Cl. ................................................. 165/2,
62/333, 165/50, 165/105
[51] Int. Cl. .................................................F25b 13/00,
F28d 15/00
[50] Field of Search............................................. 62/333,
334; 165/22, 50, 105, 26, 27, 2

[56] References Cited
UNITED STATES PATENTS

| 3,127,929 | 4/1964 | Ringquist | 165/22 |
| 2,715,514 | 8/1955 | Stair | 165/50 X |

*Primary Examiner*—William F. O'Dea
*Assistant Examiner*—P. D. Ferguson
*Attorneys*—Harry G. Martin, Jr. and J. Raymond Curtin ABSTRACT: A heating and cooling system for controlling the temperature of air circulating within a plurality of separate areas, located within a common enclosure, to provide comfort conditioning to occupants of the areas comprising a plurality of independently operable air-conditioning apparatus including heat-transfer means located within each of the areas, means to circulate air to be supplied to the area over said heat-transfer means in heat-transfer relation with the refrigerant of said apparatus and control means operable to vary the temperature of the air circulating over the heat-transfer means to obtain desired thermal effects. A hot water circulating loop and a cold water circulating loop are provided, the refrigerant passing in heat-transfer relation with the hot water when heating the air and passing in heat transfer relation with the cold water when cooling the air.

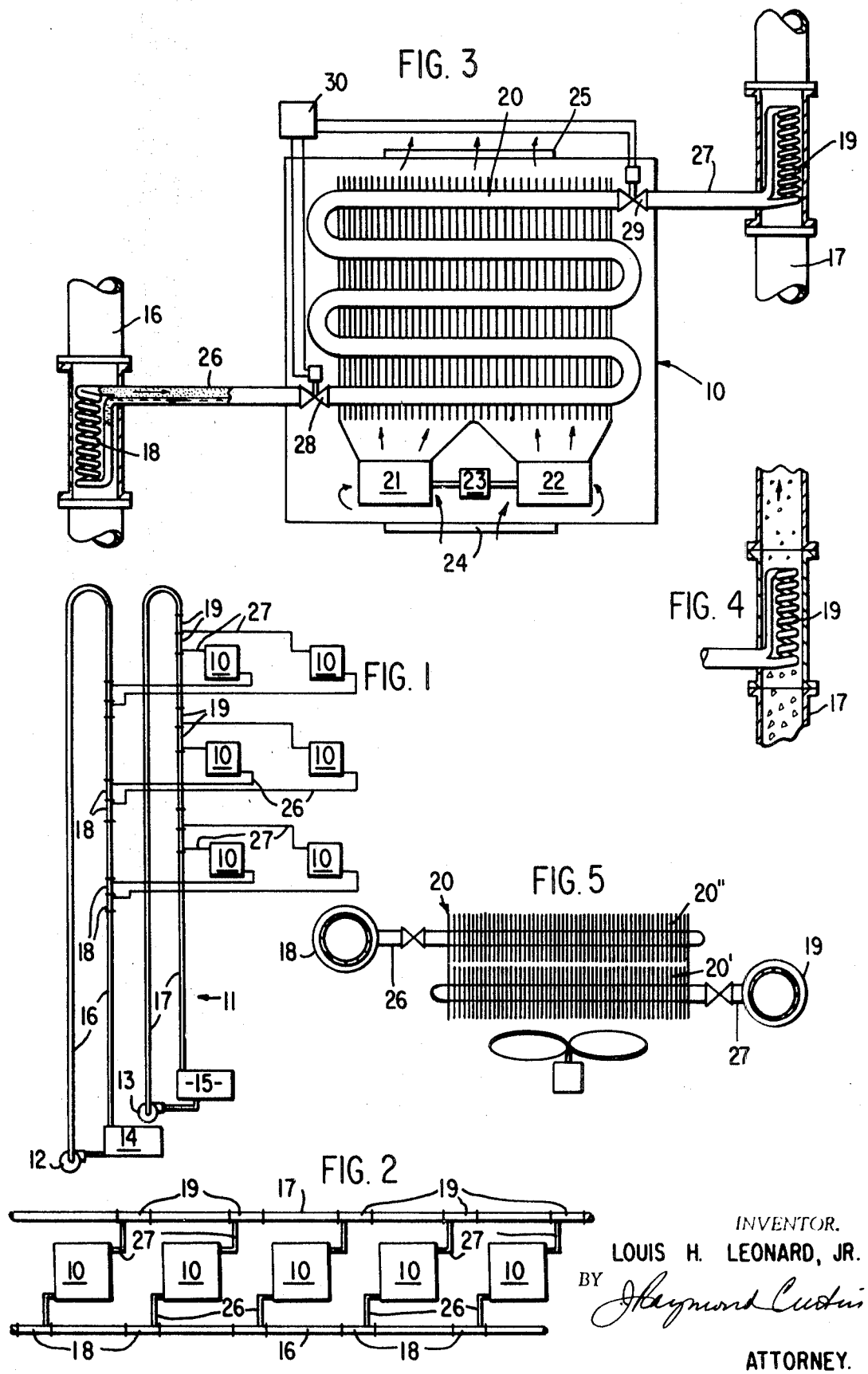

HEATING AND COOLING SYSTEM

BACKGROUND OF THE INVENTION

This invention relates primarily to a heating and cooling system for use where it is desired to condition simultaneously a plurality of areas such as apartments in apartment buildings, offices in commercial buildings and rooms in hotels, motels and hospitals. More particularly, this invention relates to such systems that enable the occupant of each area to obtain either heating or cooling during that time of the year when the requirement may change within a 24-hour period.

There are many air conditioning systems that can be installed to alternatively heat or cool a plurality of areas. However, many of these systems are unable to provide heating and cooling simultaneously without relatively expensive equipment. The inability to provide simultaneous heating and cooling is a serious drawback, especially during the intermediate seasons of spring and fall. At these times, an occupant of an individual area may desire heating while another occupant of a different area may wish to cool that area. Since the overall system can only provide heating or cooling, one of the aforementioned persons will be unable to obtain the conditioning effect desired for his area.

Those systems that do provide means for simultaneous heating and cooling often are extremely costly to install and operate. Additional components, such as costly and complex three-way and four-way valves are typically included in such systems. Additionally, many of these systems utilize a common-return conduit, wherein relatively warm water and relatively cold water that had been supplied to the separate areas for air-conditioning purposes will be intermixed and returned to a central station. A portion of the water will be delivered to cooling apparatus and the remaining quantity of water will be delivered to heating apparatus for reconditioning before being recirculated to the separate areas. The intermixing of the water substantially increases the operating costs of such systems. Alternatively, separate return conduits for the relatively warm water and the relatively cold water may be installed, but this would substantially increase the initial or installation costs for such heating and cooling systems.

The object of the present invention is to alleviate the problems discussed hereinabove by providing a heating and cooling system that can supply heat to the air circulating in one area, while reducing the temperature of air circulating within a second area to provide a cooling effect within that area. In addition, the system disclosed does not involve the use of an inordinate number of components to obtain the benefits desired. Simple, comparatively inexpensive mechanisms are provided, whereby an individual occupant may easily select the conditioning effect desired. Furthermore, the novel system disclosed herein will avoid increasing the operating costs by not intermixing a relatively warm medium and a relatively cold medium that had been supplied to each of the separate areas. However, the alleviation of this problem does not create an additional problem by increasing the installation costs. The novel system does not require separate return conduits as will be more fully explained hereinafter.

SUMMARY OF THE INVENTION

The present invention pertains to a heating and cooling system which utilizes a separate circulating-water circuit comprising one pipe for circulating a relatively warm medium and a second pipe for circulating a relatively cold medium. The two mediums will be circulated simultaneously to a plurality of heat exchangers. One-half of the total number of heat-exchangers will be in contact solely with the relatively cold medium and the other half will be in contact solely with the relatively warm medium. As will be more fully explained hereinafter, the condition of the air within a separate area may then be controlled as is desired. The heating and cooling system disclosed will be particularly useful in apartment buildings, motels and commercial office buildings.

In a preferred embodiment, each of the separate areas being conditioned will be served by three heat-exchangers. When cooling is desired, a first heat-exchanger will have the circulating relatively cold water pass therethrough in heat-transfer relationship with the refrigerant of the system. The relatively cold water will absorb heat from the refrigerant, changing the refrigerant from a gas to a liquid. The liquid refrigerant will flow from the first heat-exchanger to a second heat-exchanger, where the air to be conditioned is circulated in heat-transfer relation with the liquid refrigerant. The refrigerant will absorb heat from the air, thereby cooling the air. The refrigerant will absorb sufficient heat to become vaporized and will return to the first heat-exchanger, completing the cooling cycle.

If heating is desired, the refrigerant instead of flowing to the heat-exchanger associated with the circulating cold medium will be directed by valve means to a third heat-exchanger. This heat-exchanger is associated with circulating relatively warm water and the refrigerant will pass in heat-transfer relationship with the warm water flowing through such third heat-exchanger. The refrigerant will absorb heat from the medium and be vaporized thereby. The vaporous refrigerant will flow to the second heat-exchanger, where the air to be conditioned is circulated in heat-transfer relationship with the refrigerant. The air absorbs heat from the refrigerant gas, condensing the gas and being warmed thereby. The liquid refrigerant thus formed returns to the third heat-exchanger completing the heating cycle.

During certain periods of the year, it may be desirable to cool the air to dehumidify it, even though such cooling will reduce the temperature of the air below the desired level. Therefore, it would be extremely desirable to reheat the air before it is delivered to the area and thus maintain the temperature in the area at its desired point. An alternative embodiment of the air-conditioning apparatus serving one area provides this desirable feature.

The heat-exchanger located in each area will be divided into a first and a second portion. Each of the separate portions will contain its own refrigerant charge. One portion will be connected to the heat-exchanger associated with the circulating warm heat-exchange medium and the second portion of the heat-exchanger will be connected to the heat-exchanger associated with the circulating cold medium. When it is desired to dehumidify the air by reducing its temperature below its dew point and thereafter reheat to obtain a comfortable temperature level, both portions of the heat-exchanger will be operable. First the air will be circulated in heat-transfer relation with the portion of the heat-exchanger that will provide cooling. The air will be cooled and simultaneously water will be extracted therefrom, since the cooler air cannot hold the same quantity of water as warm air. Then the relatively cool air will be circulated in heat-transfer relation with the portion of the heat-exchanger that will provide heating. The temperature of the air will thereby be raised to its desired level. Control of the apparatus may be manual through valves or by humidistats and thermostats connected to provide automatic control as is well known in the art. The separate portions of the heat-exchanger will be properly sized for the thermal-conditioning effect for which each one is to be used. If only heating or cooling is desired, only the portion of the heat-exchanger which provides the desired effect will be operable. The heating and cooling cycles are exactly the same as those previously discussed hereinbefore.

Valve means, such as solenoid valves, control the flow of refrigerant to the heat-exchangers associated with the circulating cold and warm water. The solenoid valves can be connected to a room thermostat, thus providing automatic operation for the system.

It is readily apparent that the desiderata, previously explained hereinbefore, are obtained by the novel system herein disclosed. A simple, relatively inexpensive and effective heating and cooling system is henceforth available.

Particularly, the system will substantially reduce application engineering problems. All of the apparatus serving the areas within the enclosure will be serially connected. In contrast, almost all of the systems heretofore used in the art have had the apparatus serving a plurality of areas connected in parallel. The parallel connection of the apparatus introduces hydraulic problems relating to the quantity of the circulating heat-exchange media. Specifically, it is quite hard to add additional air-conditioning apparatus to a system that has been designed for the quantity of apparatus being served before the addition. The additional apparatus will require a portion of the heat-exchange media previously supplied to each of the "old" apparatus. By reducing the quantity of heat-exchange media to the apparatus, an occupant of an area may not be able to obtain the desired conditioning effect. The novel system will alleviate this problem, since any addition of apparatus will not reduce the quantity of heat-exchange media that will be delivered to any one particular apparatus.

BRIEF DESCRIPTION OF THE DRAWINGS

FIG. 1 illustrates schematically a type of heating and cooling system to which the present invention applies;

FIG. 2 illustrates an alternative embodiment for connecting the heating and cooling system;

FIG. 3 illustrates a schematic view, partially in section, of a preferred embodiment of air-conditioning apparatus serving one area;

FIG. 4 illustrates an alternative construction for a portion of the heating and cooling system; and FIG. 5 illustrates a top plan view of a second embodiment of the air-conditioning apparatus of FIG. 3.

DESCRIPTION OF THE PREFERRED EMBODIMENTS

A preferred embodiment of the novel heating and cooling system is represented schematically by FIG. 1 and of the drawing. As shown, the system is designed to regulate the temperature of air circulating within a plurality of separate areas forming an enclosure. In referring to the other figures of the drawing, like numerals shall refer to like parts.

Each of the areas being served by the system will have an independently operable air-conditioning apparatus 10. All of the apparatus 10 are connected in series with a dual-source of heat-exchange medium, such as water, whereby one of the sources will deliver heat to a portion of the heat-exchange medium and the second source will cool the remaining portion of the heat-exchange medium. A central circulating system comprising a separate heating loop and a separate cooling loop will deliver the relatively warm heat-exchange medium and the relatively cool heat-exchange medium to each of the air-conditioning apparatus, so a source of heating and a source of cooling may always be available for each area.

The central-circulating system 11 includes pump means 12 and 13 which direct the water through the system. A portion of the water is directed through heating means 14, such as an oil-fired boiler, and the remaining portion of the water is circulated through cooling means 15 shown as a water chiller of a refrigeration machine. If a water chiller is utilized, the relatively warm heat-exchange medium may be the condensing water from the refrigerant condenser used in conjunction with the water chiller. This would eliminate the need for a separate heating means. Conduit 16 will circulate the relatively warm medium and conduit 17 will circulate the relatively cold medium. Regulation of the apparatus being used, to obtain the desired water temperature, may be accomplished automatically by any of various well-known means.

The water is directed over a plurality of heat-exchangers or heat-exchange means associated with each of the air-conditioning apparatus for the individual areas. One such heat-exchanger 18 will be disposed in heat-transfer relation with the relatively warm water, while a second heat-exchanger 19 for each area will be disposed in heat-transfer relation with the relatively cold water. The water, after passing through the heat-exchangers, will return to the heating means 14 or cooling means 15 for reconditioning before being recirculated.

Heat-exchangers 18 and 19 are relatively small in size. A preferred embodiment has the heat-exchangers disposed within conduits 16 and 17. However, it is within the scope of this invention for the heat-exchangers to be mounted on the outer surface of the conduits.

Referring now specifically to FIG. 3 of the drawing, there is shown typical air-conditioning apparatus of this invention serving an individual area. Incorporated in each area is relatively large heat-transfer means 20, shown in the form of a finned coil assembly. Each heat-transfer means is provided with a charge of refrigerant, such as R-22 or a similar commercial refrigerant.

Fans 21 and 22, driven by motor 23, route room air over the heat transfer means 20. The air is drawn into a casing enclosing the heat-transfer means through filter 24 and is circulated over the heat-transfer means 20 in heat-transfer relation with the refrigerant of the apparatus. The air is either warmed or cooled as desired, in a manner to be more fully explained hereinafter and is thereafter discharged through grille 25 to the area being conditioned.

Connecting heat-transfer means 20 to the heat-exchanger 18 is disposed in the warm water conduit 16 is conduit 26. Conduit 27 connects the heat-transfer means 20 to the heat-exchanger 19 disposed in the cold water conduit 17. Valve means 28 and 29, operable in a manner to be more fully described hereinafter, are disposed between the heat-transfer means 20 and heat-exchangers 18 and 19 respectively.

COOLING CYCLE OPERATION

Assume the occupant of the area being served by the apparatus shown in FIG. 3 desires to cool the air. Preferably, valve means 28 and 29 are normally closed solenoid valves. The occupant of the area would place the mode-of-operation switch 30 in its cooling position. As shown, the switch 30 is electrically connected to the valves 28 and 29. Placing the switch 30 in its cooling position will activate valve 29. When valve 29 opens, the refrigerant of the apparatus can circulate between heat-transfer means 20 and heat-exchanger 19 via conduit 27.

Liquid refrigerant in heat-transfer means 20 will absorb heat from the air routed over the heat-transfer means in heat-transfer relation with the refrigerant, the refrigerant being vaporized thereby and the air cooled prior to its delivery to the area being served. The absorption of heat by the refrigerant will not only change the refrigerant from a liquid to a gas, but will also increase the pressure of the refrigerant. The relatively high-pressure vaporous refrigerant will flow upwards through conduit 27 into heat-exchanger 19, which is at a relatively low pressure due to the relatively cold medium circulating therethrough. The refrigerant will be condensed in heat-exchanger 19 by passing in heat-transfer relation with the relatively cold water. The liquid refrigerant will then return by gravity to the heat-transfer means 20 via conduit 27, thus completing the cooling cycle. The conduit 27 and coils 19 and 20 are sized so that the desired two-phase bidirectional refrigerant flow will obtain.

HEATING CYCLE OPERATION

If the occupant of the area being served now desires to warm the air, he first would set the switch 30 in its heating position. This would return valve 29 to its normally closed position and would open valve 28.

The liquid refrigerant in heat-transfer means 20 will then flow by gravity through conduit 26 to heat-exchanger 18. The refrigerant will be vaporized therein, by passing therethrough in heat-transfer relation with the relatively warm water circulating through conduit 16. The vaporous refrigerant therein formed will also have its pressure increased. The vaporous refrigerant will return to heat-transfer means 20 via conduit 26, since the heat-transfer means is at a low pressure relative to heat-exchanger 18. Thus, it is apparent the refrigerant flow during the heating and cooling cycles is produced partially by pressure differentials caused by thermal gradients.

The air to be conditioned is routed over the heat-transfer means 20 by fans 21 and 22. The relatively cold air will condense the vaporous refrigerant by passing in heat-transfer relation therewith. The heat released by the condensing refrigerant will be absorbed by the air, thus warming the air as desired. The liquid refrigerant thus formed will thereafter flow by gravity via conduit 26 to heat-exchanger 18 for recommencement of the heating cycle.

Valve 28 will have a small orifice (not shown) for permitting any liquid refrigerant trapped in heat-exchanger 18 to vaporize and flow into heat-transfer means 20 for cooling cycle operation, even though the valve 28 has been closed by turning switch 30 to its cooling mode of operation. Thus, substantially the full charge of refrigerant is available for cooling cycle operation. It will be appreciated a greater volume of refrigerant is required to satisfy a conventional cooling requirement than is necessary to satisfy a conventional heating requirement in applications of the kind under consideration here.

If it is desired to automatically operate the apparatus, a room thermostat can be connected to switch 30. By setting the thermostat for a desired temperature, the switch 30 will be automatically operated, thus automatically opening or closing valves 28 and 29 to obtain the desired temperature.

FIG. 1 depicts the heating and cooling system serving a plurality of vertically connected apparatus. Alternatively, FIG. 2 shows how the circulating medium conduits 16 and 17 would be connected if the apparatus serving the areas were horizontally connected. It should be noted that the cool medium conduit 17 would be located above the apparatus, and the warm medium conduit 16 would be positioned below the apparatus. This would enable the refrigerant flow to and from heat-transfer means 20 and heat-exchangers 18 and 19 to be maintained by natural forces, as determined by the physical state of the refrigerant.

If a large number of areas are being served by the system disclosed herein, it might be difficult for the relatively cold medium to be maintained at a temperature sufficiently low for purposes of cooling the air within the area. To maintain the cold temperature for the heat-exchange medium, a mixture of ice particles and cold water can be circulated. The ice particles can be formed in the manner disclosed by U.S. Pat. No. 3,257,818, issued to J. A. Papapanu. As the water is warmed by absorbing heat from the refrigerant, a portion of the ice particles melts, thus maintaining the temperature of the water at its desired value, the heat-transfer action being attained by the latent heat of fusion of the melted ice. FIG. 4 of the drawing depicts the mixture of cold water and ice particles being circulated through conduit 17.

If ice particles are to be circulated, cooling means 15 should preferably be a direct-contact evaporative cooler, which may be utilized for forming the ice particles.

During certain periods of the year, it may be desirable to cool the air to dehumidify it, even though such cooling will reduce the temperature of the air within the area below the desired level. Therefore, it would be extremely desirable to reheat the air before it is delivered to the area and thus maintain the temperature in the area as desired. FIG. 5 represents an alternative embodiment of the air-conditioning apparatus serving one area, wherein this desirable feature can be obtained.

Heat-transfer means 20 is divided into a first portion or section 20' and a second portion or section 20''. Sections 20' and 20'' will each have a refrigerant charge contained therein. Section 20' is connected to heat-exchanger 19 via conduit 27. Conduit 26 connects heat-exchanger 18 to heat-transfer means section 20''. When it is desirable to dehumidify the air and then reheat it, the refrigerant contained in section 20' will flow to heat exchanger 19, whereby the refrigerant will be condensed and the cooling cycle as previously explained hereinbefore will be obtained. Simultaneously, the refrigerant of section 20'' of heat transfer means 20 will flow to heat exchanger 18, whereby the refrigerant will be vaporized and the heating mode of operation, as previously explained, will be obtained. Thus, by operating the heating and cooling cycles simultaneously, it is possible to obtain the desired temperature and humidity conditions. Control of the apparatus can either be manual through valves (not shown) or automatic through means well known to those skilled in the art.

If only heating or only cooling is desired, only the portion of the heat-transfer means which provides the desired effect will be operable. The heating and cooling cycles will be exactly the same as previously described hereinbefore. It should be understood that the tubes comprising sections 20' and 20'' of heat transfer means 20 will be properly sized for the thermal-conditioning effect that each one will be used for.

During certain times of the year, especially during the summer and winter seasons, all areas within the enclosure may require the same mode of operation for the air-conditioning apparatus. When such conditions exist, it is within the scope of this invention for only the relatively warm medium or the relatively cold medium to be circulated, thus affording a reduction in the cost of operation of the system.

By positioning the heat-exchangers 18 and 19 directly in the path of the circulating heat-exchange medium, a substantial saving in installation costs is obtained. Additionally, the need for a completely separate return conduit for each of the circulating heat-exchange mediums is eliminated. The heating and cooling systems herein disclosed is substantially a two-pipe system. Furthermore, the system does not utilize a compressor for obtaining cooling or heating. A considerable reduction in operating costs is thus obtained.

While I have described and illustrated a preferred embodiment of my invention, it will be understood that my invention is not limited thereto, since it may be otherwise embodied within the scope of the following claims.

I claim:

1. A method of varying the temperature of air within an enclosure, including a plurality of individual areas, each having an air-conditioning apparatus comprising heat-transfer means including a first heat-exchange coil having a refrigerant charge contained therein for varying the temperature of air flowing thereover comprising:

A. supplying a relatively cold heat-exchange medium through a first conduit to a plurality of second heat-exchange coils associated with said first conduit;
   B. supplying a relatively warm heat-exchange medium through a second conduit to a plurality of third heat-exchange coils associated with said second conduit;
   C. actuating a first valve to communicate at least a portion of said first heat-exchange coil with said second heat-exchange coil when it is desired to cool said air, said refrigerant flowing to said second heat-exchange coil where it passes in heat-transfer relation with said relatively cold medium, whereby the refrigerant is condensed; said condensed refrigerant returning by gravity to said first heat-exchange coil where it passes in heat-transfer relation with air to be cooled, whereby said refrigerant is vaporized and said air is cooled; and
   D. actuating a second valve to communicate at least a portion of said first heat-exchange coil with said third heat-exchange coil when it is desired to heat said air, said refrigerant flowing by gravity to said third heat-exchange coil where it passes in heat-transfer relation with said relatively warm medium, whereby the refrigerant is vaporized, said vaporized refrigerant returning to said first heat-exchange coil where it passes in heat-transfer relation with air to be warmed whereby said refrigerant is condensed and said air is warmed.

2. A method of heating or cooling air within an enclosure including a plurality of individual areas, each having air-conditioning apparatus comprising a first heat-transfer coil having a refrigerant charge contained therein for varying the temperature of air flowing thereover comprising:

A. supplying a relatively cold heat-exchange medium through a first conduit to a plurality of second heat-exchange coils associated with said first conduit;

B. supplying a relatively warm heat-exchange medium through a second conduit to a plurality of third heat-exchange coils associated with said second conduit; and C. selectively communicating said first heat-exchange coil with said second heat-exchange coil when it is desired to cool said air, said refrigerant flowing to said second heat-exchange coil where it passes in heat-transfer relation with said relatively cold medium, whereby the refrigerant is condensed, said condensed refrigerant returning by gravity to said first heat-exchange coil, where it passes in heat-transfer relation with air to be cooled, whereby said refrigerant is vaporized and said air is cooled; and selectively communicating said first heat-exchange coil with said third heat-exchange coil when it is desired to warm said air, said refrigerant flowing to said third heat-exchange coil by gravity where it passes in heat-transfer relation with said relatively warm medium, whereby the refrigerant is vaporized, said vaporized refrigerant returning to said first heat-exchange coil where it passes in heat-transfer relation with air to be warmed, whereby said refrigerant is condensed and said air is warmed.

3. A heating and cooling system for a plurality of areas comprising:

A. a first circulating system through which a heat-exchange medium is passed including:
  i. means operable to chill said medium to a relatively cold predetermined temperature, and
  ii. first conduit means;
B. a second circulating system through which a heat-exchange medium is passed including:
  i. means operable to heat said medium to a relatively warm predetermined temperature, and
  ii. second conduit means;
C. a plurality of heat-exchange means disposed in said first conduit means said relatively cold heat-exchange medium passing therethrough;
D. a plurality of heat-exchange means disposed in said second conduit means said relatively warm heat-exchange medium passing therethrough;
E. a plurality of independently operable air-conditioning apparatus including:
  i. a heat-exchanger having a refrigerant charge contained therein, and
  ii. means associated with said heat-exchanger to route air thereover, said air being thereafter supplied to the area being served by said apparatus, said air having passed in heat-transfer relation with said refrigerant in said heat-exchanger; and
F. first and second valve means selectively operable to direct said refrigerant to said heat-exchange means disposed in said first conduit means when it is desired to cool the area being served and to direct said refrigerant to said heat-exchange means disposed in said second conduit means when it is desired to heat the area being served.

4. A heating and cooling system in accordance with claim 3 wherein said relatively cold heat-exchange medium comprises a mixture of cold water and ice particles.

5. An air-conditioning system for varying the temperature of air within an enclosure including a plurality of areas comprising:

A. a first circulating system through which a heat-exchange medium is passed including:
  i. means operable to chill said medium to a relatively cold predetermined temperature, and
  ii. first conduit means;
B. a second circulating system through which a heat-exchange medium is passed including:
  i. means operable to heat said medium to a relatively warm predetermined temperature, and
  ii. second conduit means;
C. a plurality of heat-exchange means disposed in said first conduit means said relatively cold medium passing therethrough;
D. a plurality of heat-exchange means disposed in said second conduit means said relatively warm heat-exchange medium passing therethrough;
E. a plurality of independently operable air-conditioning apparatus including:
  i. heat-transfer means having a refrigerant charge contained therein, and
  ii. means associated with said heat-transfer means to route air thereover, said air being thereafter supplied to the area being served by said air having passed in heat-transfer relation with said refrigerant in said heat-transfer means; and
F. valve means operable to direct at least a portion of said refrigerant to said heat-exchange means disposed in said first conduit means when it is desired to cool said air, said valve means being further operable to direct at least a portion of said refrigerant to said heat-exchange means disposed in said second conduit means when it is desired to heat said air.

6. A heating and cooling system in accordance with claim 5 wherein said relatively cold heat exchange medium comprises a mixture of cold water and ice particles.

7. A heating and cooling system for a plurality of areas, including an air-conditioning apparatus disposed in each of said areas including a heating-exchange coil having a refrigerant charge, comprising:
  i. means to cool a heat-exchange medium;
  ii. conduit means connected to said cooling means for circulating said cool heat-exchange medium;
  iii. a plurality of first heat-exchange means disposed in said conduit means in heat-transfer relation with said cold medium;
  iv. means to warm said heat-exchange medium;
  v. conduit means connected to said heating means for circulating said warm heat-exchange medium;
  vi. a plurality of second heat-exchange means disposed in said conduit means in heat-transfer relation with said warm medium; and
  vii. means for selectively operating said air-conditioning apparatus to either heat the area being served by said apparatus or cool the area being served by the apparatus, said means including first valve means operable only to pass said refrigerant of said apparatus in heat-transfer relation with said cold medium in said first heat-exchange means when it is desired to cool said area, and said means further including second valve means operable only to pass said refrigerant in heat-transfer relation with said warm medium in said second heat-exchange means when it is desired to heat said area, said refrigerant flowing by gravity from said first heat-exchange means to said heat-exchange coil when cooling is desired and said refrigerant flowing by gravity from said heat-exchange coil to said second heat-exchange means when heating is desired.